(No Model.)
H. O. LOTHROP.
MACHINE FOR MAKING WIRE TUBES.
No. 290,694. Patented Dec. 25, 1883.
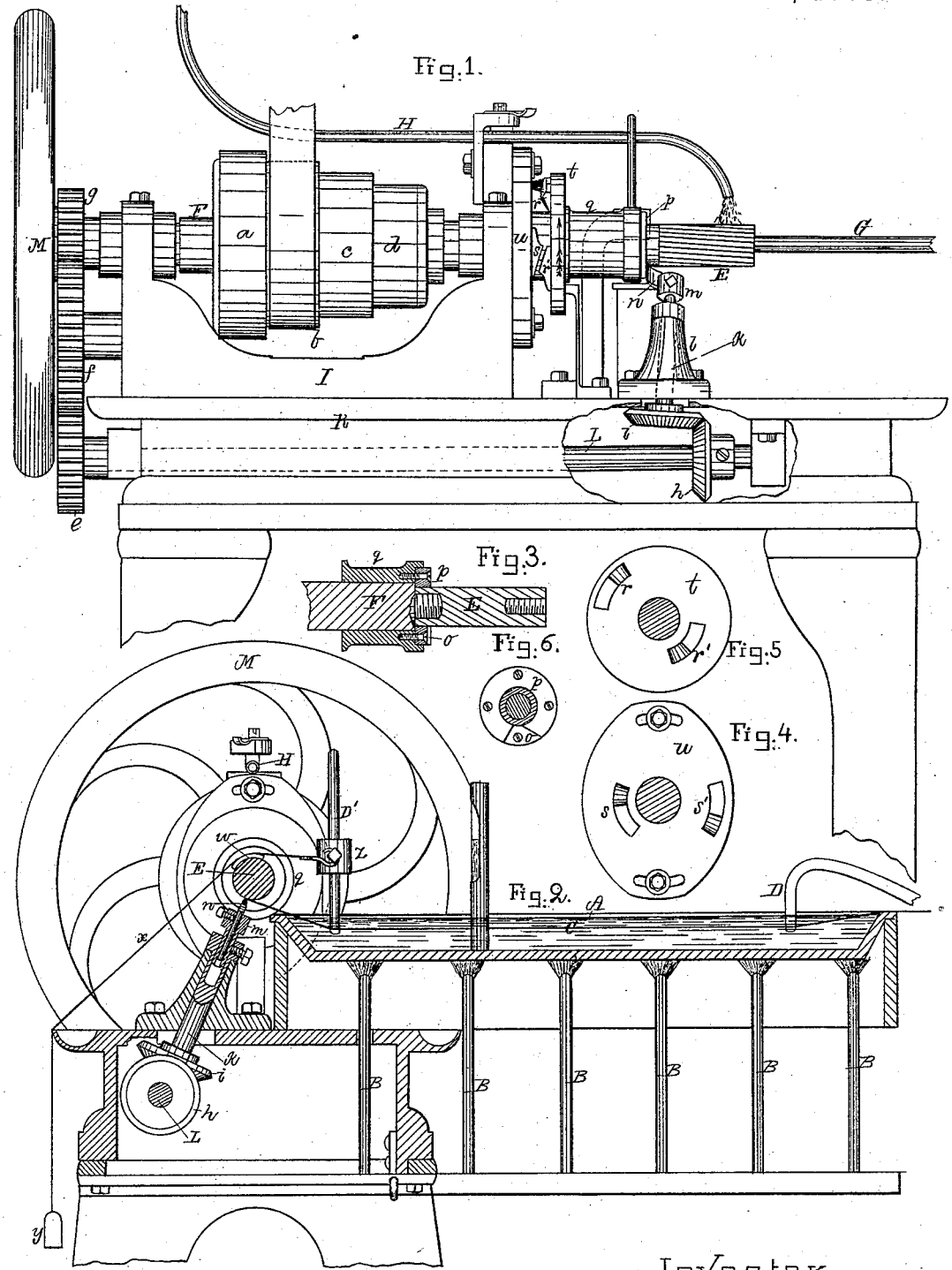
Witnesses.
S. N. Piper
E. B. Pratt
Inventor.
Henry Orville Lothrop
by R. H. Eddy atty.

UNITED STATES PATENT OFFICE.

HENRY ORVILLE LOTHROP, OF BOSTON, MASSACHUSETTS.

MACHINE FOR MAKING WIRE TUBES.

SPECIFICATION forming part of Letters Patent No. 290,694, dated December 25, 1883.

Application filed August 1, 1883. (No model.)

*To all whom it may concern:*

Be it known that I, HENRY ORVILLE LOTHROP, of Boston, in the county of Suffolk, of the Commonwealth of Massachusetts, have invented a new and useful Improvement in Machinery for Making Ferrules or Tubes of Wire; and I do hereby declare the same to be described in the following specification, and represented in the accompanying drawings, of which—

Figure 1 is a side elevation, and Fig. 2 a transverse and vertical section, of a machine embodying my invention, the nature of which is defined in the claims hereinafter presented. Fig. 3 is a vertical section of certain of the parts, to be described as connected with or applied to the driving-arbor of the machine at and near its inner end. Figs. 4 and 5 are inner side views of the stationary and rotary cam-plates, to be described. Fig. 6 is a front view of the ring $p$, hereinafter explained.

This machine is for the conversion of wire into tubes or "ferrules," essentially such as are described in the United States Patent entitled Reissue No. 4,431, dated June 20, 1871, and granted to me on an invention made by me. The said machine has connected with or suitably adapted to it a trough for holding the solder, through which the wire is run, and by which it is coated preparatory to its conversion into a tube by being wound on a former spirally grooved longitudinally, though substantially cylindrical or very slightly conical.

In Fig. 2 of the drawings the said solder-trough is shown at A as having a series of gas-burners, B, disposed beneath it for heating it. The wire is represented at C as passing through the trough, and guides D D', extending therein, such wire going from such guides to and around the former E, screwed to the inner end of the arbor F. From the said former a rod, G, extends, as shown in Fig. 1, such rod being for supporting the tube of wire as it leaves the former and is advanced therefrom. Such former E has a series of grooves made lengthwise in it, the said series extending entirely around it, and having each of its grooves slightly spiral from end to end of it. Furthermore, the former is a little tapering or conical, it being smaller in diameter at its end that is farther from the arbor. The former E is thus made tapering, to allow of the shrinkage of the wire tube as it becomes cooled by the water discharged upon it by means of a pipe, H, arranged as represented. Were the former cylindrical the contraction of the wire tube in cooling would cause it to bind too strongly on the former for such tube to be moved on the said former lengthwise thereof to advantage.

The object of making the former spirally grooved, as set forth, is to cause the tube during each advance of it on the former to turn a little thereon, in order that each lateral bend of the wire may be caused to extend transversely of the tube a little or sufficiently beyond the next preceding lateral bend, to prevent the rupture or breakage of the tube that will usually result when the bends are in one straight line lengthwise of the tube. By my improvement the series of bends, instead of being in a straight course from end to end of the tube, become arranged in a long spiral about it.

The arbor F has fixed on it a series of driving-pulleys, $a\ b\ c\ d$, and is sustained in suitable bearings of a head or poppet, I, supported by a base, K. Within such base is a shaft, L, carrying at its rear end a spur-gear, $e$, which, by an intermediate gear, $f$, engages with a gear, $g$, fixed on the arbor F, there also being a fly-wheel, M, to such arbor. By means of bevel-gears $h\ i$, applied to the shaft L, and a shaft, $k$, (shown in part in Fig. 1 by dotted lines,) rotary motion is imparted to the latter shaft. The said shaft $k$, inclined from the vertical, as represented, and supported in a suitable standard, $l$, carries the wire-bender supporter $m$, whose shank extends down into the standard, and is held therein by a set-screw, as shown in Fig. 2. The wire-bender (represented at $n$) is a cam or wiper provided with a shank, to extend down within the supporter $m$, and to be fixed therein by a set-screw, as above mentioned. The said bender revolves with and is revolved by the shaft $k$. During part of each revolution of the shaft the said bender strikes the wire and forces it laterally into a recess, $o$, within a ring, $p$, (see Fig. 6,) such recess and bender being suitably formed for imparting to the wire its necessary lateral bend or crook. The said ring is secured to the end of a sleeve, $q$, by screws, as shown in Fig. 3. The sleeve slides on the arbor F lengthwise thereof, but is or should be connected with it by a "feather connection," so as to be revolved with and by the said arbor. The forward movement of the sleeve $q$ is effected during each revolution of it by means of four cams, $r\ r'$ and $s\ s'$, the two marked $r$ and $r'$ being projected from a disk or circular plate or annulus, $t$, fixed to the sleeve at its rear end, concentrically with the arbor. Another such disk or annulus, $u$, fixed to the end of the poppet or head I, carries the other two cams $s\ s'$. The arrangement of these cams $r\ r'$ and $s\ s'$ on their annuli are shown in Figs. 4 and 5, in which it will be seen that the two co-operative cams $s$ and $r'$ are each sufficiently nearer the shaft than are each of the co-operative cams $r$ and $s'$, to prevent the cam $r'$ from operating against the cam $s'$ during each revolution of the disk $t$. All the cams are in action at once, and but once during each revolution of the disk $t$; but were each cam at the same distance from the shaft, there would be two movements of the sleeve effected by them, instead of one only, in each revolution of the disk.

The object of using four cams, arranged as described, on the two disks or annuli, instead of one cam only to each disk or annulus, is to prevent the sleeve while being moved lengthwise on the shaft from binding laterally thereon. The four cams, when operating together, steady the sleeve at opposite parts of it, so as to cause it, in advancing, to bear equally on opposite sides of the shaft with little friction, comparatively, to what would result were but two cams employed, great power being necessary to effect the endwise movement of the tube upon the former E. There is placed on the wire C, where it first bears against the former E, a wiper, $w$, (see Fig. 2,) which is a greased cushion, it being held down upon the wire by means of a chain or wire, $x$, extending across it and attached to the supporter $z$ of the guide D', such chain or wire $x$ having a weight, $y$, fixed to it at its lower end. This wiper is to remove from the wire the surplus of solder taken up by it from the trough, the said removal being effected by the wiper as the wire passes between it and the former E.

The recessed annulus $p$, instead of being fixed to the cut-off sleeve by screws, may be in one piece with it.

In the above-described machine, I claim—

1. The cast-off sleeve-disk $t$ and the stationary disk $u$, provided with the two sets of operative cams $r\ r'\ s\ s'$, arranged substantially as set forth.

2. The combination of the cast-off sleeve $q$, provided with the recess $o$ or the annulus $p$, having such recess, with the rotary bender $n$, arranged and provided with mechanism for operating it substantially as set forth.

3. The combination of the former E, spirally grooved substantially as set forth, with the arbor F and the cast-off sleeve $q$, provided with mechanism for operating them, substantially as set forth.

4. The combination of the rod G with the former E, the arbor F, and the cast-off sleeve $q$, provided with mechanism for operating them, substantially as set forth.

5. The combination of the wiper $w$ with the former E, the arbor F, and the cast-off sleeve $q$, provided with mechanism for operating them, substantially as set forth.

HENRY ORVILLE LOTHROP.

Witnesses:
R. H. EDDY,
E. B. PRATT.